US009577882B2

(12) United States Patent
Masada

(10) Patent No.: US 9,577,882 B2
(45) Date of Patent: Feb. 21, 2017

(54) CONTROL SYSTEM, MASTER STATION, AND REMOTE STATION

(71) Applicant: Mitsubishi Electric Corporation, Tokyo (JP)

(72) Inventor: Tomoya Masada, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/904,175

(22) PCT Filed: Apr. 24, 2014

(86) PCT No.: PCT/JP2014/061564
§ 371 (c)(1),
(2) Date: Jan. 11, 2016

(87) PCT Pub. No.: WO2015/162754
PCT Pub. Date: Oct. 29, 2015

(65) Prior Publication Data
US 2016/0134475 A1 May 12, 2016

(51) Int. Cl.
G06F 15/16 (2006.01)
H04L 12/24 (2006.01)
(Continued)

(52) U.S. Cl.
CPC .......... *H04L 41/0816* (2013.01); *G06F 13/12* (2013.01); *G06F 13/14* (2013.01); *G06F 15/17* (2013.01); *H04L 29/06* (2013.01); *H04L 41/12* (2013.01)

(58) Field of Classification Search
CPC ............... H04L 29/06; H04L 67/025
(Continued)

(56) References Cited

U.S. PATENT DOCUMENTS 5,157,778 A * 10/1992 Bischoff ................ G06F 9/52
703/14
5,404,476 A * 4/1995 Kadaira .............. G06F 12/1036
711/207
(Continued)

FOREIGN PATENT DOCUMENTS

JP 02-116903 A 5/1990
JP 03-276358 A 12/1991
(Continued)

OTHER PUBLICATIONS

Communication dated Dec. 30, 2015, from the Intellectual Property Office of Taiwan in counterpart application No. 103132938.
(Continued)

Primary Examiner — Hieu Hoang
(74) Attorney, Agent, or Firm — Sughrue Mion, PLLC; Richard C. Turner

(57) ABSTRACT

A control system includes: a master station including a PLC executing user program; and a remote station including a communication memory to which a PLC device is assigned, a slave communication unit, and a unit to or from which one or more pieces of data is input or output, and being connected to the master station through a network. The PLC transmits, to the slave communication unit, assignment object designation information designating an object that is among unit data input or output to or from the unit and to which a PLC device is assigned, and an assignment rule. The slave communication unit assigns unit data that is among unit data input or output to or from the unit and is designated by the received assignment object designation information to the communication memory based on the received assignment rule.

8 Claims, 13 Drawing Sheets

(51) Int. Cl.
*H04L 29/06* (2006.01)
*G06F 13/12* (2006.01)
*G06F 13/14* (2006.01)
*G06F 15/17* (2006.01)

(58) Field of Classification Search
USPC .................................................. 709/249, 210
See application file for complete search history.

(56) References Cited

U.S. PATENT DOCUMENTS

| | | | |
|---|---|---|---|
| 2003/0069973 A1* | 4/2003 | Ganesan | H04L 29/06 709/226 |
| 2003/0126233 A1* | 7/2003 | Bryers | H04L 29/06 709/219 |
| 2003/0225909 A1 | 12/2003 | Glasco et al. | |
| 2005/0027920 A1* | 2/2005 | Fitzsimmons | G06F 13/4022 710/317 |
| 2013/0018979 A1* | 1/2013 | Cohen | H04L 67/125 709/217 |
| 2013/0036092 A1* | 2/2013 | Lafont | G06F 17/30132 707/634 |
| 2013/0332927 A1* | 12/2013 | Tang | G06F 9/45545 718/1 |
| 2015/0067233 A1* | 3/2015 | Cheng | G06F 12/0246 711/103 |
| 2015/0220459 A1* | 8/2015 | Morita | G06F 13/128 710/110 |

FOREIGN PATENT DOCUMENTS

| | | |
|---|---|---|
| JP | 08-314875 A | 11/1996 |
| JP | 09-319415 A | 12/1997 |
| JP | 11-161309 A | 6/1999 |
| JP | 2000-078229 A | 3/2000 |
| JP | 2005-332336 A | 12/2005 |
| JP | 2007-102764 A | 4/2007 |
| JP | 2009-015401 A | 1/2009 |
| JP | 2009-140224 A | 6/2009 |
| JP | 2011-028525 A | 2/2011 |
| JP | 4910604 B2 | 4/2012 |
| JP | 2012-099023 A | 5/2012 |
| JP | 5012548 B2 | 8/2012 |
| JP | 2012-174148 A | 9/2012 |
| JP | 2013-054584 A | 3/2013 |

OTHER PUBLICATIONS

Japanese Office Action issued in JP 2015-526785 dated Sep. 24, 2014.
International Search Report of PCT/JP2014/061564 dated Jun. 10, 2014.

* cited by examiner

FIG.5

UNIT 22-0
 B0:RWw: A/D CONVERSION PERMISSION/PROHIBITION SETTING
 B1:RWw: CH1 AVERAGE TIME/AVERAGE NUMBER OF TIMES/MOVEMENT AVERAGE SETTING
 B2:RWw: CH2 AVERAGE TIME/AVERAGE NUMBER OF TIMES/MOVEMENT AVERAGE SETTING
 B10:RWr: CH1 DIGITAL VALUE
 B11:RWr: CH2 DIGITAL VALUE

UNIT 22-1
 B0:RWw: A/D CONVERSION PERMISSION/PROHIBITION SETTING
 B1:RWw: CH1 AVERAGE TIME/AVERAGE NUMBER OF TIMES/MOVEMENT AVERAGE SETTING
 B2:RWw: CH2 AVERAGE TIME/AVERAGE NUMBER OF TIMES/MOVEMENT AVERAGE SETTING
 B10:RWr: CH1 DIGITAL VALUE
 B11:RWr: CH2 DIGITAL VALUE

UNIT 22-2
 B0:RWw: A/D CONVERSION PERMISSION/PROHIBITION SETTING
 B1:RWw: CH1 AVERAGE TIME/AVERAGE NUMBER OF TIMES/MOVEMENT AVERAGE SETTING
 B2:RWw: CH2 AVERAGE TIME/AVERAGE NUMBER OF TIMES/MOVEMENT AVERAGE SETTING
 B10:RWr: CH1 DIGITAL VALUE
 B11:RWr: CH2 DIGITAL VALUE

FIG.6

```
UNIT 32-0
 B0:RWw: A/D CONVERSION PERMISSION/PROHIBITION SETTING
 B3:RWw: CH3 AVERAGE TIME/AVERAGE NUMBER OF TIMES/MOVEMENT AVERAGE SETTING
 B4:RWw: CH4 AVERAGE TIME/AVERAGE NUMBER OF TIMES/MOVEMENT AVERAGE SETTING
 B10:RWr: CH3 DIGITAL VALUE
 B11:RWr: CH4 DIGITAL VALUE

UNIT 32-1
 B0:RWw: A/D CONVERSION PERMISSION/PROHIBITION SETTING
 B1:RWw: CH1 AVERAGE TIME/AVERAGE NUMBER OF TIMES/MOVEMENT AVERAGE SETTING
 B3:RWw: CH3 AVERAGE TIME/AVERAGE NUMBER OF TIMES/MOVEMENT AVERAGE SETTING
 B10:RWr: CH1 DIGITAL VALUE
 B12:RWr: CH3 DIGITAL VALUE

UNIT 32-2
 B0:RWw: A/D CONVERSION PERMISSION/PROHIBITION SETTING
 B2:RWw: CH2 AVERAGE TIME/AVERAGE NUMBER OF TIMES/MOVEMENT AVERAGE SETTING
 B4:RWw: CH4 AVERAGE TIME/AVERAGE NUMBER OF TIMES/MOVEMENT AVERAGE SETTING
 B10:RWr: CH2 DIGITAL VALUE
 B11:RWr: CH4 DIGITAL VALUE
 B21:RWr: CH2 ERROR CODE
 B22:RWr: CH4 ERROR CODE
```

CONTROL SYSTEM, MASTER STATION, AND REMOTE STATION

CROSS REFERENCE TO RELATED APPLICATIONS

This is a National Stage of International Application No. PCT/JP2014/061564 filed Apr. 24, 2014, the contents of which are incorporated herein by reference in its entirety.

FIELD

The present invention relates to a control system in which a master station and a remote station are connected to each other through a network, a master station included in the control system, and a remote station included in the control system.

BACKGROUND

Conventionally, a programmable logic controller (PLC) system is used as a system that controls industrial devices. The PLC system is configured from a combination of a plurality of units including a PLC unit. Also, by utilization of a communication unit, the PLC system can be connected to a remote system provided in a remote place through a network (see, for example, Patent Literature 1). The remote system is configured from a combination of a plurality of units. The PLC unit can control industrial devices to be controlled, which are connected to the respective units from which the remote system is configured, by controlling each of the units from which the remote system is configured through the network. In the following, the remote system will be referred to as a remote station and the PLC system to control the remote station will be referred to as a master station.

Here, a user executes assignment of a refresh device of the master station and assignment of a refresh device of the remote station by using a parameter setting function of an engineering tool. The assignment of the refresh device of the master station is to assign a PLC device to a communication memory. The assignment is to associate positions in both memories with each other. The assignment of the refresh device of the remote station is to assign a shared memory of each of the units from which the remote station is configured to a communication memory of the remote station. The result of the assignment of the refresh device of the master station is stored in the master station as a parameter of the master station and the result of the assignment of the refresh device of the remote station is stored in the remote station as a parameter of the remote station.

CITATION LIST

Patent Literature

Patent Literature 1: Japanese Patent Application Laid-Open No. 2011-28525

SUMMARY

Technical Problem

However, since a user needs to access each of the master station and the remote station and to set each parameter, there is a problem in that operation related to assignment of a refresh device is troublesome. There is also a problem in that an error in assignment of a refresh device easily occurs since operation is troublesome.

The present invention has been achieved in view of the above and it is an object of the present invention to obtain a control system that can execute setting of a parameter expeditiously and easily.

Solution to Problem

In order to solve the above problems and achieve the object, an aspect of the present invention is a control system including: a master station that includes a first processing unit that executes a user program; and a remote station that includes a first buffer to which a device accessed by the first processing unit in accordance with the user program is assigned and that is used for data transfer between the remote station and the master station, a second processing unit, and a subunit to or from which one or more pieces of data is input or output, the remote station being connected to the master station through a transmission path, wherein the first processing unit transmits, to the second processing unit, first designation information designating an object that is among the one or more pieces of data and to which a device assigned to the first buffer is assigned and second designation information designating an assignment rule, and after the first designation information and the second designation information are received, the second processing unit assigns data designated by the first designation information among the one or more pieces of data to the first buffer in accordance with the assignment rule designated by the second designation information.

Advantageous Effects of Invention

According to a control system of the present invention, it becomes possible to execute setting of a parameter easily since assignment of a refresh device of a remote station is executed automatically when a user collectively sets, in a master station, information required for the assignment of the refresh device.

BRIEF DESCRIPTION OF DRAWINGS

FIG. 5 is a diagram illustrating an example of assignment object designation information.

FIG. 6 is a diagram illustrating an example of assignment object designation information.

DESCRIPTION OF EMBODIMENTS

A control system, a master station, and a remote station according to embodiments of the present invention will be described below in detail with reference to the drawings. Note that the present invention is not limited to the embodiments.

Embodiment

Figure 1:
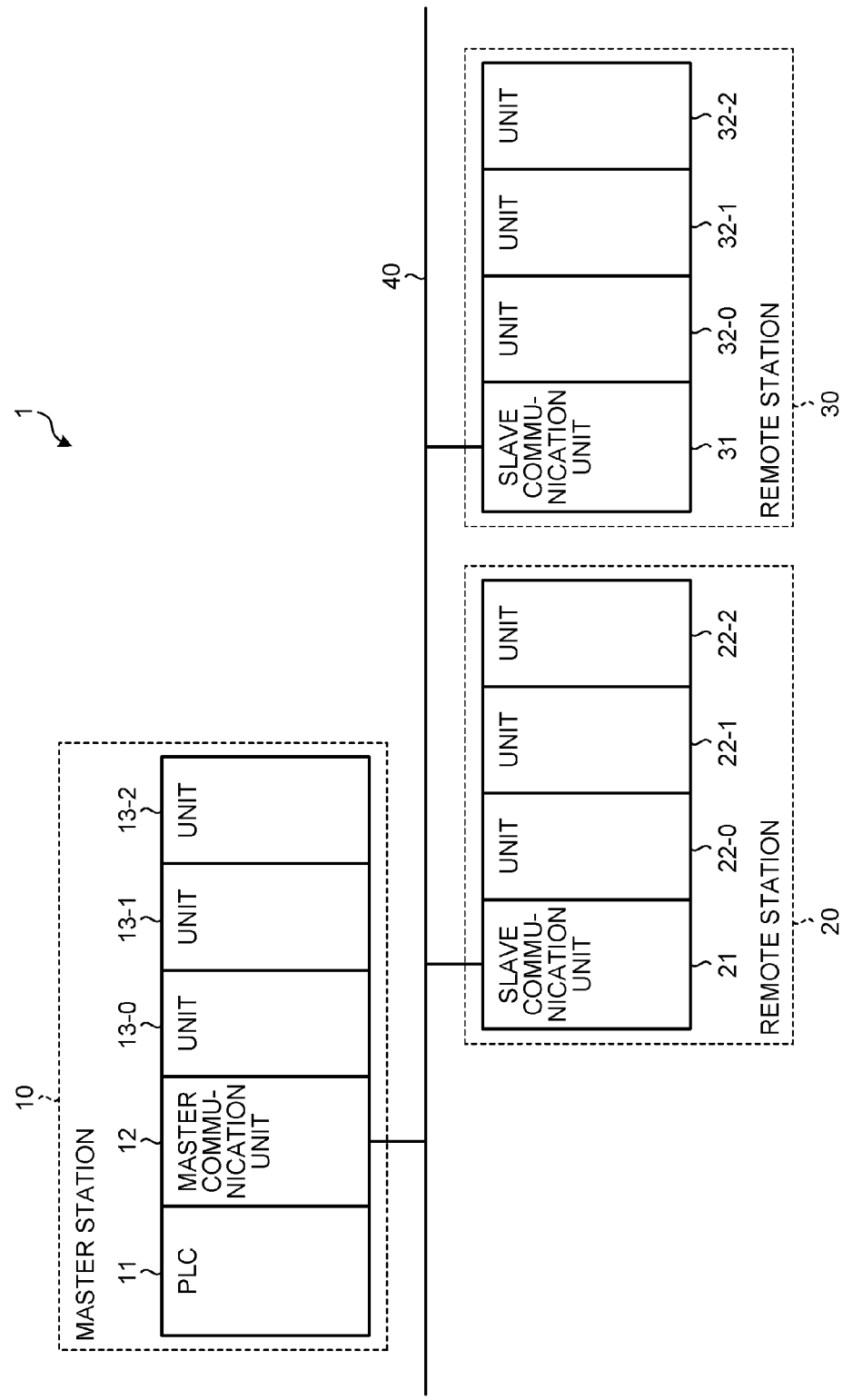
FIG. 1 is a diagram illustrating a configuration of a control system according to an embodiment of the present invention.

FIG. 1 is a diagram illustrating a configuration of a control system according to an embodiment of the present invention. A control system 1 is configured such that a master station 10, a remote station 20, and a remote station 30 are connected to each other through a network 40. The number of remote stations included in the control systems 1 is arbitrarily determined.

The master station 10 includes a PLC unit (hereinafter, referred to as PLC) 11, a master communication unit 12, a unit 13-0, a unit 13-1, and a unit 13-2. Note that the master station 10 includes a backplane (not illustrated) including a plurality of slots. The PLC 11, the master communication unit 12, and the three units 13-0, 13-1, and 13-2 are physically and electrically connected to each other by being respectively mounted in the slots included in the backplane. The slots are respectively specified by slot numbers. For example, a slot number "0" is assigned to a slot in which the PLC 11 is mounted and the slot numbers are assigned to the slots in ascending order toward the right side on the plane of the sheet of paper. When it is assumed that a slot to which a slot number "X" is assigned is referred to as a slot #X, the master communication unit 12 is mounted in a slot #1, the unit 13-0 is mounted in a slot #2, the unit 13-1 is mounted in a slot #3, and the unit 13-2 is mounted in a slot #4 according to the example illustrated in the drawing.

The PLC 11 is a unit that performs overall control of the whole control system 1. The master communication unit 12 is included in the master station 10 and is a unit to enable the PLC 11 of the master station 10 to transfer data to and from each unit included in the remote stations 20 and 30. The units 13-0 to 13-2 are units controlled by the PLC 11. Each of the units 13-0 to 13-2 is connected to a device to be controlled and executes a predetermined operation with respect to the device to be controlled on the basis of the control performed by the PLC 11. Note that a unit, such as the units 13-0 to 13-2, which executes a predetermined operation with respect to a device to be controlled on the basis of the control performed by the PLC 11, is collectively referred to as a general unit. Examples of a general unit include a motion CPU unit to control a servo motor through a servo amplifier attached to a drive unit of a production device or a facility device, an input unit to input a signal of a switch or a sensor attached to a proper place on a production device or a facility device, and an output unit to output a control output to an actuator or the like. The kind and number of general units connected to a backplane can be arbitrarily selected according to the purpose of the control system 1.

The remote station 20 includes a slave communication unit 21, a unit 22-0, a unit 22-1, and a unit 22-2. Similarly to the master station 10, the remote station 20 includes a backplane and the units included in the remote station 20 are connected to each other through the backplane of the remote station 20. In the remote station 20, a slot to which each unit is connected is also identified by a slot number. In the remote station 20, a slot number "#0" is assigned to a slot in which the slave communication unit 21 is mounted and the slot numbers are assigned to the slots in ascending order toward the right side on the plane of the sheet of paper. That is, the unit 22-0 is mounted in a slot #1, the unit 22-1 is mounted in a slot #2, and the unit 22-2 is mounted in a slot #3.

The remote station 30 includes a slave communication unit 31, a unit 32-0, a unit 32-1, and a unit 32-2. Similarly to the master station 10, the remote station 30 includes a backplane and the units included in the remote station 30 are connected to each other through the backplane. In the remote station 30, a slot to which each unit is connected is also identified by a slot number. In the remote station 30, a slot number "#0" is assigned to a slot in which the slave communication unit 31 is mounted and the slot numbers are assigned to the slots in ascending order toward the right side on the plane of the sheet of paper. That is, the unit 32-0 is mounted in a slot #1, the unit 32-1 is mounted in a slot #2, and the unit 32-2 is mounted in a slot #3.

The slave communication units 21 and 31 are units to respectively connect the remote stations 20 and 30 to the network 40 and to enable data transfer between the PLC 11 and the remote stations 20 and 30. The unit 22-0 to the unit 22-2 and the units 32-0 to 32-2 are general units.

Next, a detailed configuration of each unit will be described. Since the slave communication units 21 and 31 have similar configurations, only the slave communication unit 21 will be described as a representative. Also, the common parts of the general units (unit 13-0 to 13-2, 22-0 to 22-2, and 32-0 to 32-2) have similar configurations. Thus, only the unit 22-0 will be described as a representative.

Figure 2:
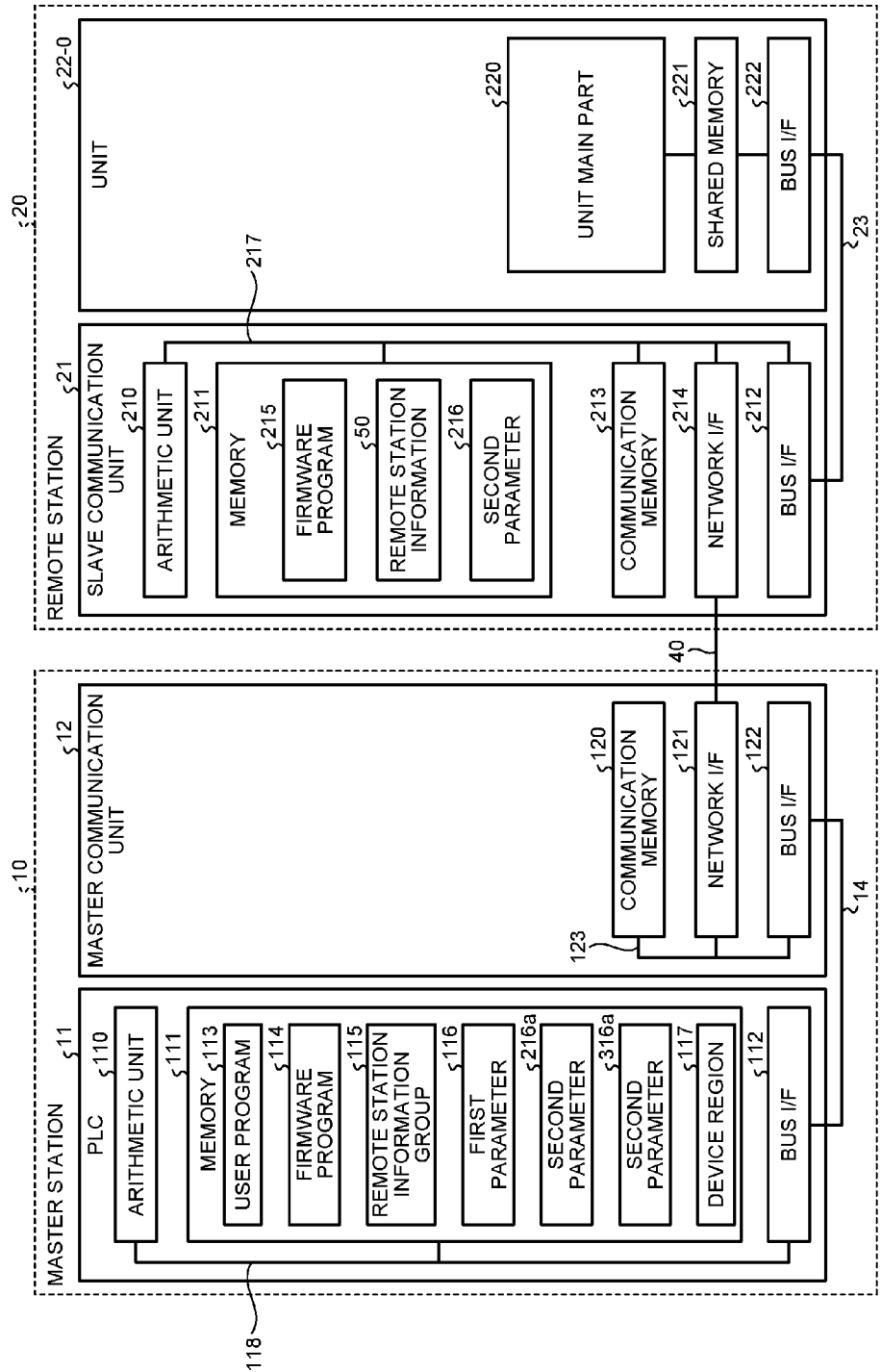
FIG. 2 is a diagram illustrating a more detailed configuration of each unit.

FIG. 2 is a diagram illustrating a more detailed configuration of each of the PLC 11, the master communication unit 12, the slave communication unit 21, and the unit 22-0.

The PLC 11 and the master communication unit 12 are connected to each other through a bus 14. The bus 14 is included in the backplane of the master station 10. Note that the units 13-0 to 13-2 are connected to the PLC 11 through the bus 14.

The PLC 11 includes an arithmetic unit 110, a memory 111, a bus interface (I/F) 112, and a bus 118. The arithmetic unit 110, the memory 111, and the bus I/F 112 are connected to each other through the bus 118. The arithmetic unit 110 is, for example, a central processing unit (CPU). The memory 111 is configured from a read only memory (ROM), a random access memory (RAM), storage, a removable memory device, or a combination thereof. The bus I/F 112 is an interface for connection with the bus 14.

The memory 111 stores a user program 113, a firmware program 114, a remote station information group 115, a first parameter 116, a second parameter 216a, and a second parameter 316a. Also, in the memory 111, a device region 117 including a plurality of PLC devices is reserved. Each of the PLC devices is a logical address used by the user program 113. In the following, a memory region indicated by a PLC device or data stored in a memory region indicated by a PLC device may be referred to as a PLC device. The user program 113 can directly refer to the PLC device. Also, the user program 113 can refer to the PLC device through a label.

The user program 113 is a program describing how to operate the control system 1. The user program 113 is created by a user and is previously set in the PLC 11 with an engineering tool. The user program 113 stores, in the device region 117, intermediate data for calculation and data output to the general units. Also, data input from the general units is stored in the device region 117. The user program 113 can acquire, from the device region 117, data input from the general units.

The firmware program 114 is a basic program that provides an environment to execute the user program 113. The user program 113 can use various kinds of hardware of the PLC 11 through the firmware program 114. Note that the firmware program 114 is previously set in the PLC 11, for example, by a manufacturer of the PLC 11.

The remote station information group 115 and the first parameter 116 will be described later. The second parameter 216a is backup data on a second parameter 216 described later and the second parameter 316a is backup data on the second parameter 316 described later.

The master communication unit 12 includes a communication memory 120, a network I/F 121, a bus I/F 122, and a bus 123. The communication memory 120, the network I/F 121, and the bus I/F 122 are connected to each other through the bus 123. The communication memory 120 is a memory that functions as a buffer used for data transfer between the PLC 11 and the general units (unit 22-0 to 22-2 and 32-0 to 32-2) in the remote stations 20 and 30. The network I/F 121 is an interface for connection with the network 40. The bus I/F 122 is an interface for connection with the bus 14.

In the remote station 20, the slave communication unit 21 and the unit 22-0 are connected to each other through a bus 23. The bus 23 is included in the backplane of the remote station 20. Note that the unit 22-1 and the unit 22-2 are also connected to the slave communication unit 21 through the bus 23.

The slave communication unit 21 includes an arithmetic unit 210, a memory 211, a bus I/F 212, a communication memory 213, a network I/F 214, and a bus 217. The arithmetic unit 210, the memory 211, the bus I/F 212, the communication memory 213, and the network I/F 214 are connected to each other through the bus 217. The arithmetic unit 210 is, for example, a CPU. The memory 211 is configured from a ROM, a RAM, storage, a removable memory device, or a combination thereof. The communication memory 213 is a memory that functions as a buffer used for data transfer between the PLC 11 and the units 22-0 to 22-2 in the remote station 20. The network I/F 214 is an interface for connection with the network 40. The bus I/F 212 is an interface for connection with the bus 23.

The memory 211 stores a firmware program 215, remote station information 50, and the second parameter 216. The firmware program 215 is previously set in the slave communication unit 21, for example, by a manufacturer of the slave communication unit 21. The arithmetic unit 210 realizes an operation of the slave communication unit 21 by executing the firmware program 215.

The remote station information 50 and the second parameter 216 will be described later.

The unit 22-0 includes a unit main part 220, a shared memory 221, and a bus I/F 222. The bus I/F 222 is an interface for connection with the bus 23. The unit main part 220 is a module to realize a function corresponding to the type of the unit 22-0 (such as input unit, output unit, or motion CPU unit). The unit main part 220 operates with data input from the PLC 11 as a command and outputs data corresponding to the operation result to the PLC 11 as a response. Note that the unit main part 220 may output a response even when there is no input of a command from the PLC 11. Also, the unit main part 220 may only receive an input of a command from the PLC 11 and may not output a response thereto.

The shared memory 221 is a memory to function as a buffer with which the unit main part 220 receives an input of data and outputs data.

Figure 3:
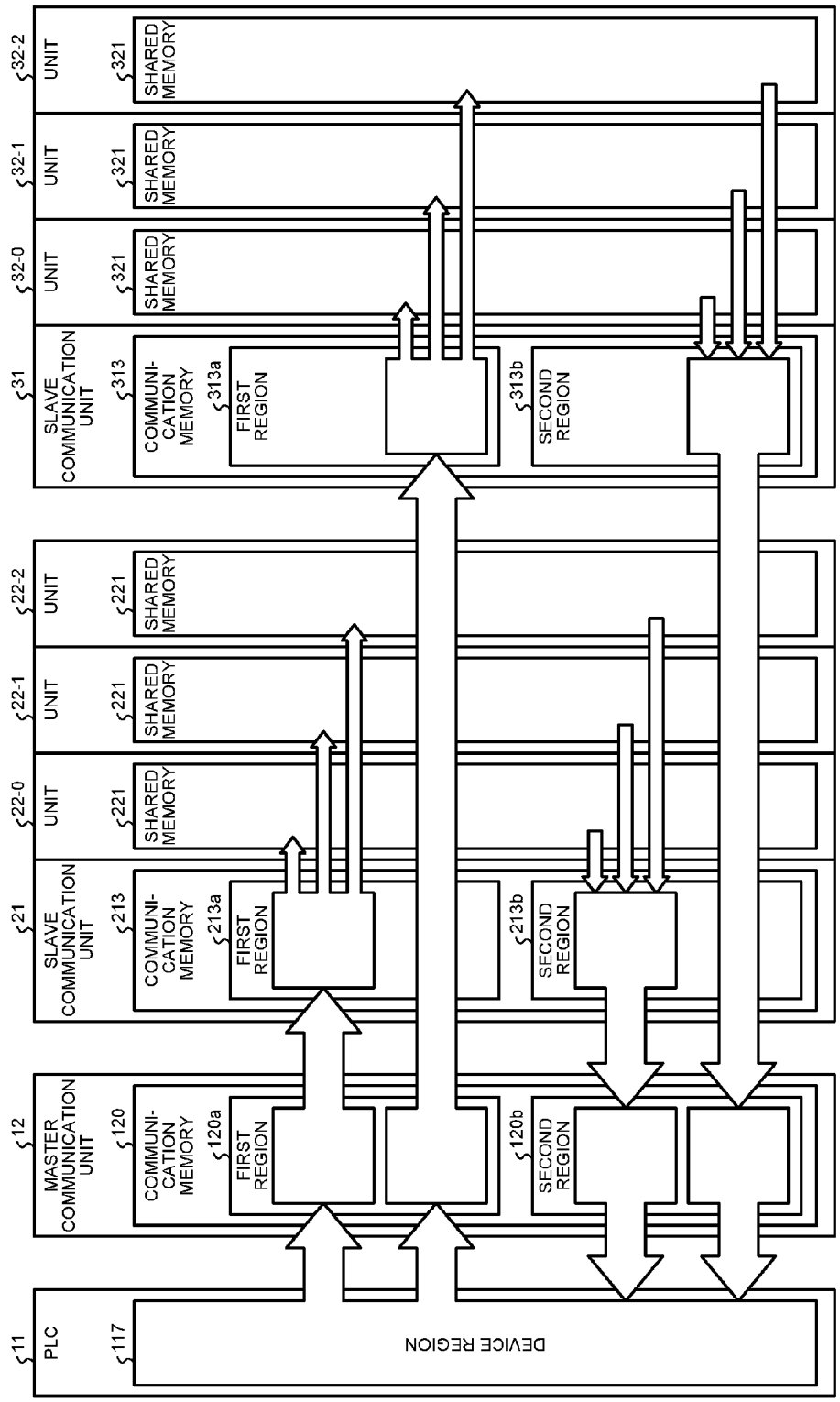
FIG. 3 is a diagram for explaining a flow of data transferred between a PLC and general units.

FIG. 3 is a diagram for explaining a flow of data transferred between the PLC 11 and general units. Note that in the description, a sign 313 is assigned to a communication memory included in the slave communication unit 31 and a sign 321 is assigned to a shared memory included in each of the units 32-0 to 32-2.

The communication memory 120 includes a first region 120a, into which data transferred from the PLC 11 to the general units (hereinafter, referred to as first transferred data) is buffered, and a second region 120b, into which data transferred from the general units to the PLC 11 (hereinafter, referred to as second transferred data) is buffered. The communication memory 213 includes a first region 213a, into which first transferred data is buffered, and a second region 213b, into which second transferred data is buffered. The communication memory 313 includes a first region 313a, into which first transferred data is buffered, and a second region 313b, into which second transferred data is buffered.

The first transferred data stored by the user program 113 in a PLC device for the first transferred data is transferred to the first region 120a in the master communication unit 12. The first transferred data transferred to the first region 120a in the master communication unit 12 is transferred to the first region 213a in the slave communication unit 21 or to the first region 313a in the slave communication unit 31. The first transferred data transferred to the first region 213a in the slave communication unit 21 is transferred to the shared memory 221 of one of the general units that are the units 22-0 to 22-2. Also, the first transferred data transferred to the first region 313a of the slave communication unit 31 is transferred to the shared memory 321 of one of the general units that are the units 32-0 to 32-2.

In each of the units 22-0 to 22-2, the second transferred data stored by the unit main part 220 in the shared memory 221 is transferred from the shared memory 221 to the second region 213b in the slave communication unit 21. The second transferred data transferred to the second region 213b in the slave communication unit 21 is transferred to the second region 120b in the master communication unit 12. The second transferred data transferred to the second region 120b in the master communication unit 12 is stored in a PLC device for the second transferred data.

In each of the units 32-0 to 32-2, the second transferred data stored by a unit main part 320 into the shared memory 321 is transferred from the shared memory 321 to the second region 313b in the slave communication unit 31. The second transferred data transferred to the second region 313b in the slave communication unit 31 is transferred to the second region 120b in the master communication unit 12. The second transferred data transferred to the second region 120b in the master communication unit 12 is stored in a PLC device for the second transferred data.

Data transfer between the device region 117 and the communication memory 120 is cooperatively executed by a bus system (bus I/F 112, bus 14, and bus I/F 122) of the master station 10. Data transfer between the communication memory 120 and the communication memory of each of the remote stations 20 and 30 is cooperatively executed by the network I/F 121 of the master communication unit 12, the network 40, and the network I/F of the slave communication unit. Also, in the remote stations 20 and 30, data transfer between the communication memories of the slave communication units 21 and 31 and the shared memories 221 and 321 of the general units is cooperatively executed by the bus I/Fs of the slave communication units 21 and 31, the buses provided by the backplanes, and the bus I/Fs of the general units.

The first transferred data and the second transferred data are transferred in a unit of a PLC device. The following is defined by the first parameter 116 for each PLC device: from which position in each of the communication memories 120, 213, and 313 data in a unit of a PLC device (hereinafter, referred to as unit data) is transferred. Also, a correspondence relation between the position of each piece of unit data in the communication memory 213 of the remote station 20 and the position of each piece of data in the shared memory 221 is defined by the second parameter 216. Also, a correspondence relation between the position of each piece of unit data in the communication memory 313 of the remote station 30 and the position of each piece of data in the shared memory 321 is defined by a second parameter stored in the slave communication unit 31. Note that a sign 316 is assigned to the second parameter stored in the slave communication unit 31.

Figure 4:
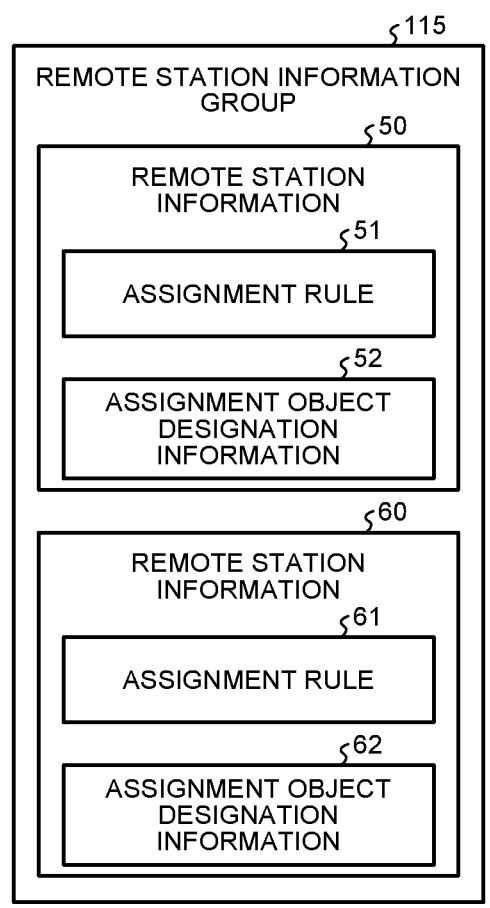
FIG. 4 is a diagram for explaining a remote station information group.

FIG. 4 is a diagram for explaining the remote station information group 115. As illustrated in FIG. 4, the remote station information group 115 includes the remote station information 50 and remote station information 60. The remote station information 50 is identical to the remote station information 50 set in the slave communication unit 21. The remote station information 60 is identical to the remote station information 60 set in the slave communication unit 31. The remote station information 50 includes an assignment rule 51 and assignment object designation information 52. The remote station information 60 includes an assignment rule 61 and assignment object designation information 62.

According to the present embodiment, the second parameters 216 and 316 are respectively generated in the remote stations 20 and 30 automatically. The assignment object designation information 52 is information describing designation of unit data to be assigned to a PLC device among unit data input/output to/from the unit main part 220. Similarly, the assignment object designation information 62 is information recording designation of unit data to be assigned to a PLC device among unit data input/output to/from the unit main part 320 in the remote station 30.

FIG. 5 is a diagram illustrating an example of the assignment object designation information 52. Here, it is assumed that a storage position of each piece of unit data in the shared memory 221 is previously determined for each kind of unit data. A character string including a combination of an alphabet "B" and a number indicates an address in the shared memory 221. The assignment object designation information 52 includes a list of addresses of the general units in the shared memory 221. Each address described in the assignment object designation information 52 is an object to which a PLC device is assigned. Also, in the assignment object designation information 52, "RWw" indicating that an assignment destination is the first region 213a or "RWr" indicating that an assignment destination is the second region 213b is associated with each address and is recorded. Note that according to the example in this drawing, attachment information for a description such as "A/D conversion permission/prohibition setting" is further associated with each address and recorded. However, the attachment information may not be recorded.

FIG. 6 is a diagram illustrating an example of the assignment object designation information 62. The assignment object designation information 62 also has a configuration similar to that of the assignment object designation information 52.

The assignment rule 51 is information describing a rule for associating each address designated by the assignment object designation information 52 with a region of each piece of unit data in the communication memory 213. For example, the assignment rule 51 can prescribe a correspondence relation between a slot number of a mounted slot and an address in the communication memory 213. Also, for example, the assignment rule 51 can prescribe a correspondence relation between an address in the communication memory 213 and an address that is designated as an assignment object by the assignment object designation information 52. In the assignment rule 51, for example, the following rule is described. That is, an address with a smaller number in the communication memory 213 is assigned to a mounted slot with a smaller slot number and an address with a smaller number in the communication memory 213 is assigned to a smaller address designated as an assignment object by the assignment object designation information 52. In the following, a description will be made with this rule as a specific example. Also, similarly to the assignment rule 51, the assignment rule 61 is information describing a rule for associating each address designated by the assignment object designation information 62 with a region of each piece of unit data in the communication memory 313.

Figure 7:
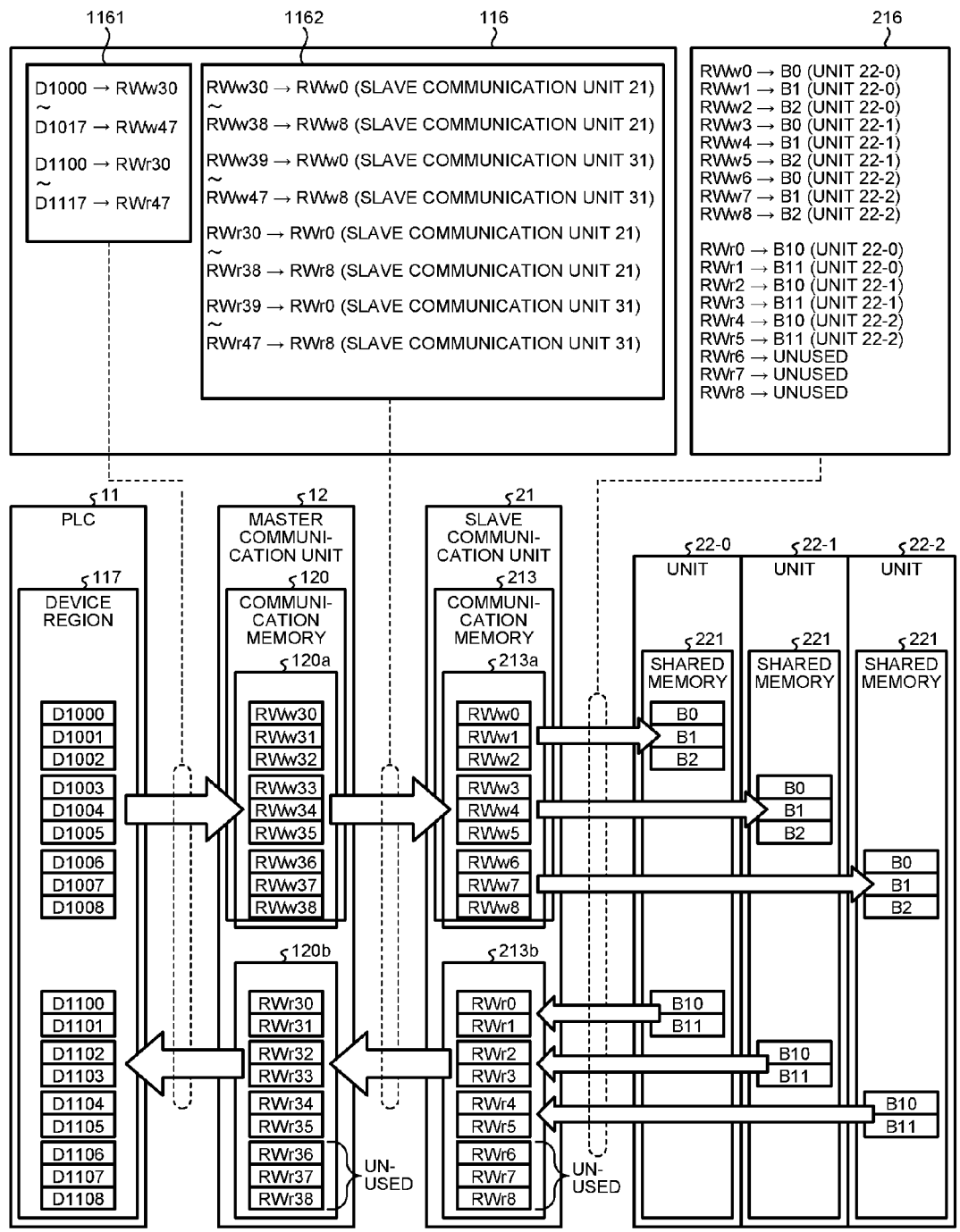
FIG. 7 is a diagram explaining an example of a correspondence relation between memories realized by a first parameter and a second parameter.
Figure 8:
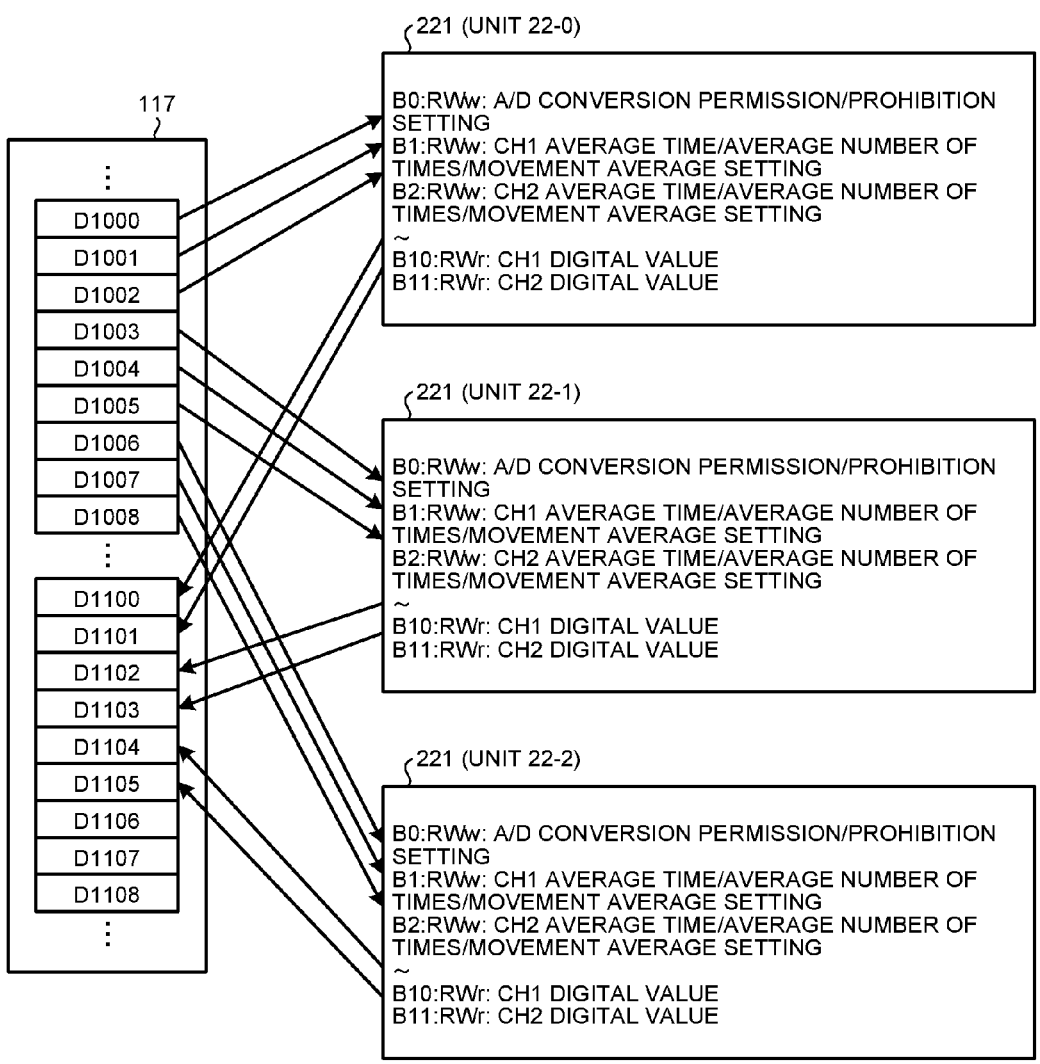
FIG. 8 is a diagram explaining an example of a correspondence relation between memories realized by the first parameter and the second parameter.

Each of FIG. 7 and FIG. 8 is a diagram explaining an example of a correspondence relation between memories realized by the first parameter 116 and the second parameter 216.

As illustrated in FIG. 7, the first parameter 116 includes first master assignment information 1161, which is information describing a correspondence relation between the device region 117 and the communication memory 120 for each PLC device, and second master assignment information 1162, which is information describing a correspondence relation between the communication memory 120 and the communication memories 213 and 313 for each PLC device. In the first master assignment information 1161 and the second master assignment information 1162, "~" indicates intermediate parts that are omitted. According to the example of the first master assignment information 1161, the PLC device "D1000" corresponds to the address "RWw30" in the communication memory 120 and the PLC device "D1001" corresponds to the address "RWw31" in the communication memory 120. Also, according to the example of the second master assignment information 1162, the address "RWw30" in the communication memory 120 corresponds to the address "RWw0" in the communication memory 213 and the address "RWw31" in the communication memory 120 corresponds to the address "RWw1" in the communication memory 213. That is, by the first parameter 116, a PLC device accessed by the arithmetic unit 110 according to the user program 113 is assigned to the communication memory 213 included in the remote station 20.

Also, according to the example of the second parameter 216, the address "RWw0" in the communication memory 213 corresponds to the address "B0" in the shared memory 221 of the unit 22-0 and the address "RWw1" in the communication memory 213 corresponds to the address "B1" in the shared memory 221 of the unit 22-0. Note that pieces of data input/output to/from the unit main part 220 are respectively stored in different addresses in the shared memory 221 depending on the kinds of data.

When the first parameter 116 and the second parameter 216 are set adequately, it is possible to associate each PLC device that is for data transfer between the master station 10 and the remote station 20, with an address in the shared memory 221 of each of the units 22-0 to 22-2 included in the remote station 20 with a one-to-one relation. As illustrated in FIG. 8, by each of the parameters 116 and 216 illustrated in FIG. 7, each PLC device is associated with an address in the shared memory 221 of each of the units 22-0 to 22-2. For example, the PLC device "D1000" is associated with the address "B0" in the shared memory 221 of the unit 22-0. Also, the PLC device "D1001" is associated with the address "B1" in the shared memory 221 of the unit 22-0.

Figure 9:
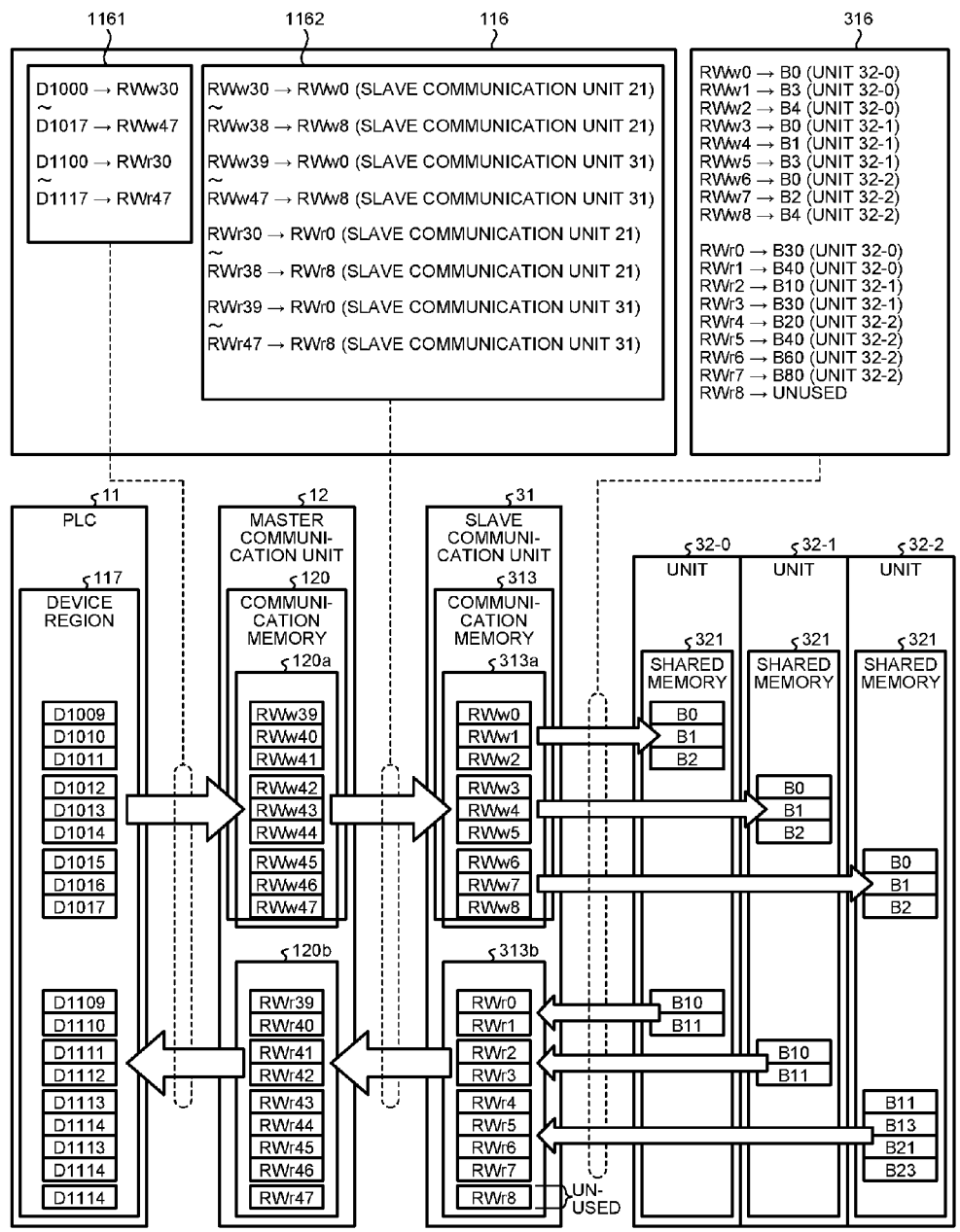
FIG. 9 is a diagram explaining an example of a correspondence relation between memories realized by a first parameter and a second parameter.
Figure 10:
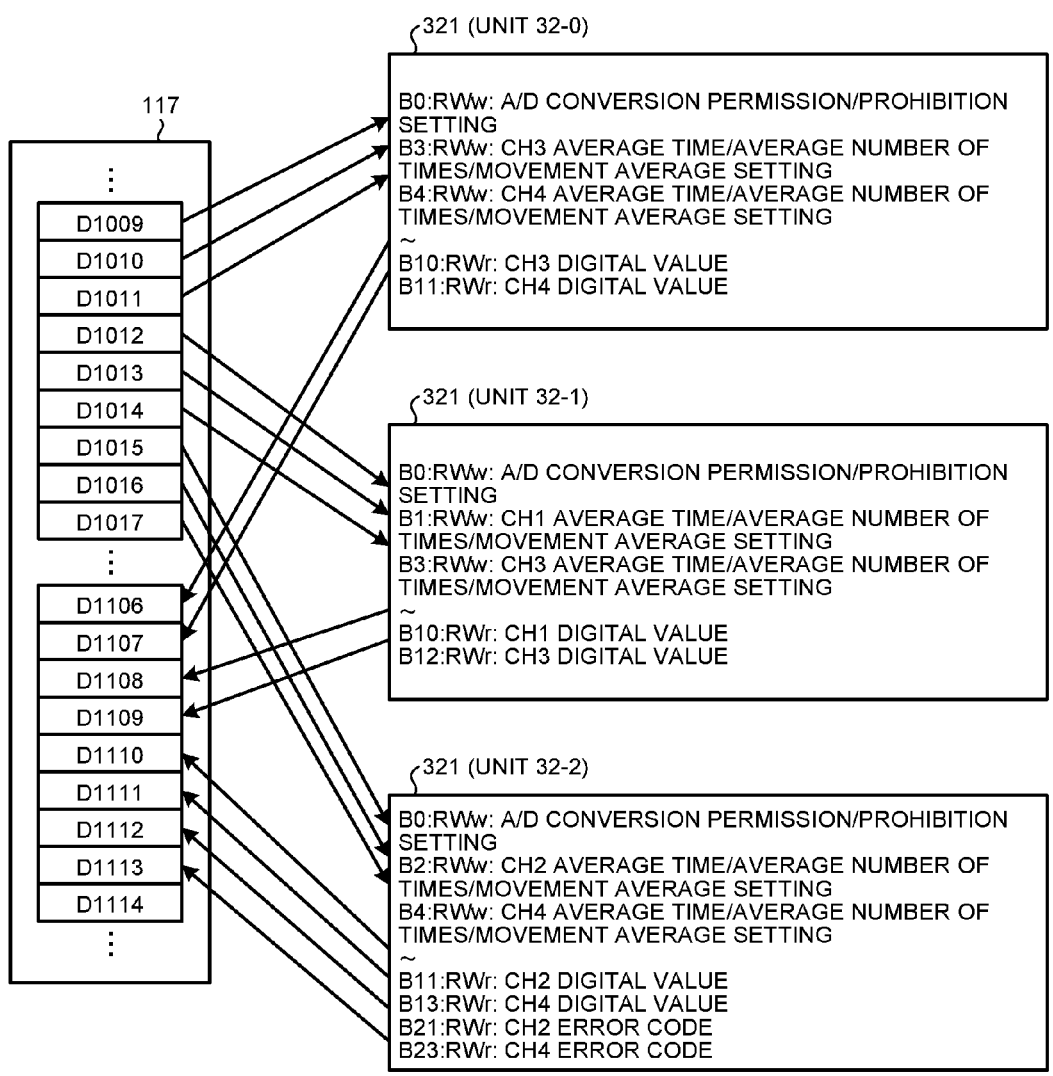
FIG. 10 is a diagram explaining an example of a correspondence relation between memories realized by the first parameter and the second parameter.

Each of FIG. 9 and FIG. 10 is a diagram explaining a correspondence relation between memories realized by the first parameter 116 and a second parameter 316. As illustrated in FIG. 9, the device region 117 and the communication memory 120 are associated with each other by the first master assignment information 1161. The communication memory 120 and the communication memory 313 are associated with each other by the second master assignment information 1162 and the communication memory 313 and the shared memory 321 of each of the units 32-0 to 32-2 are associated with each other by the second parameter 316. As a result, as illustrated in FIG. 10, each PLC device is associated with an address in the shared memory 321 of each of the units 32-0 to 32-2.

Next, an operation of the control system 1 according to the embodiment will be described. An operation executed by communication between the master station 10 and the remote station 20 and an operation executed by communication between the master station 10 and the remote station 30 are identical to each other. Thus, only an operation between the master station 10 and the remote station 20 will be described.

Figure 11:
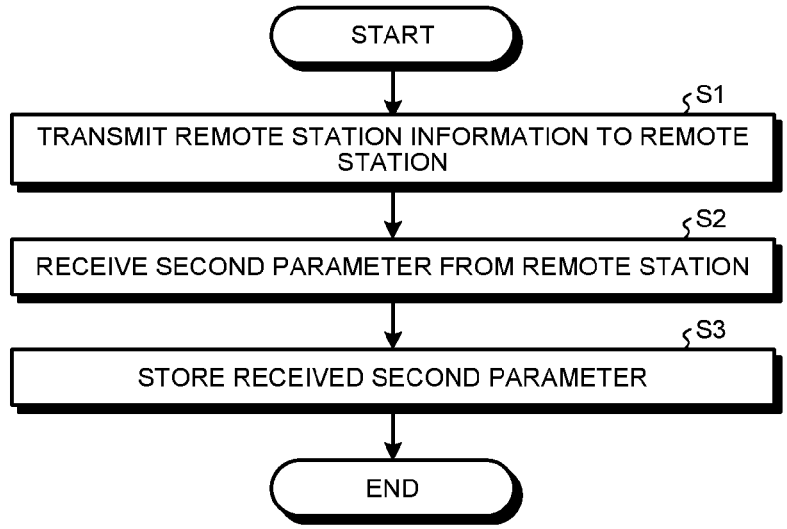
FIG. 11 is a flowchart explaining an operation of a master station to automatically generate the second parameter.

FIG. 11 is a flowchart explaining an operation of the master station 10 to automatically generate the second parameter 216. The operation illustrated in FIG. 11 is realized when the arithmetic unit 110 of the PLC 11 executes the firmware program 114. First, the arithmetic unit 110 of the PLC 11 transmits the remote station information 50 set in the memory 111 of the PLC 11 to the remote station 20 (S1). Then, the arithmetic unit 110 of the PLC 11 waits for the second parameter 216 to be transmitted from the remote station 20 by processing at S15 described later. When the second parameter 216 is received (S2), the arithmetic unit 110 of the PLC 11 stores the received second parameter 216, as the second parameter 216a that is backup data, in the memory 111 of the PLC 11 (S3) and ends the operation.

Figure 12:
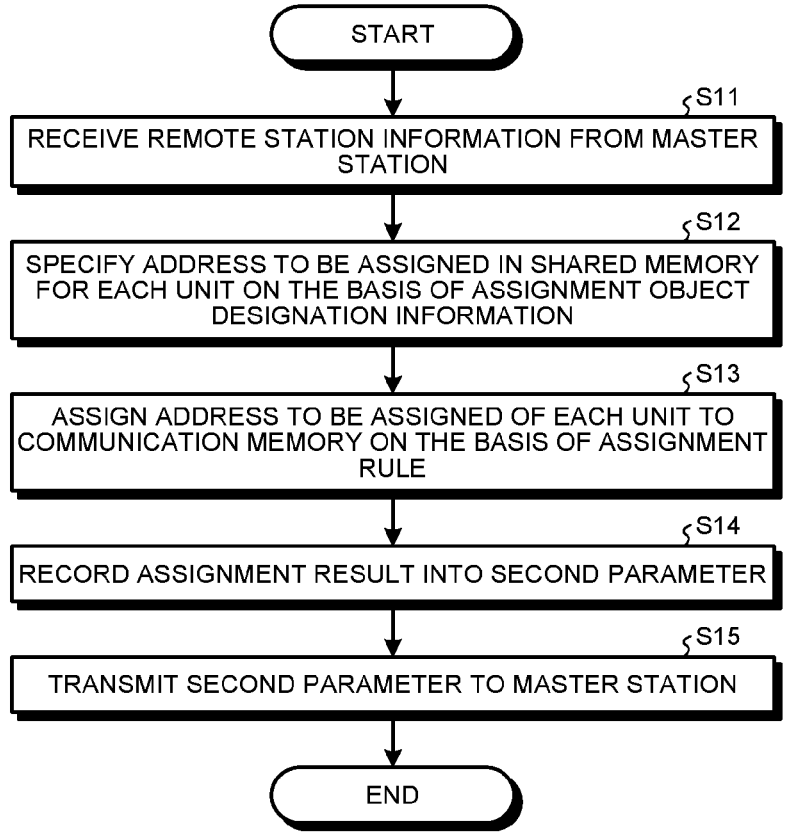
FIG. 12 is a flowchart explaining an operation of the remote station to automatically generate the second parameter.

FIG. 12 is a flowchart explaining an operation of the remote station 20 to automatically generate the second parameter 216. The operation illustrated in FIG. 12 is executed when the arithmetic unit 210 of the slave communication unit 21 executes the firmware program 215. When the remote station information 50 is received from the master station 10 (S11), the arithmetic unit 210 of the slave communication unit 21 refers to the assignment object designation information 52 included in the received remote station information 50 and specifies addresses to be assigned in the shared memory 221 for each of the unit 22-0 to unit 22-2 (S12). Then, the arithmetic unit 210 of the slave communication unit 21 assigns the specified addresses to be assigned to the communication memory 213 on the basis of the assignment rule 51 included in the received remote station information 50 (S13). Then, the arithmetic unit 210 of the slave communication unit 21 records the result of the assignment in the second parameter 216 (S14). The arithmetic unit 210 of the slave communication unit 21 stores the second parameter 216 in the memory 211 of the slave communication unit 21. Then, the arithmetic unit 210 of the slave communication unit 21 transmits the second parameter 216 to the master station 10 (S15). Then, the operation of the remote station 20 ends.

Figure 13:
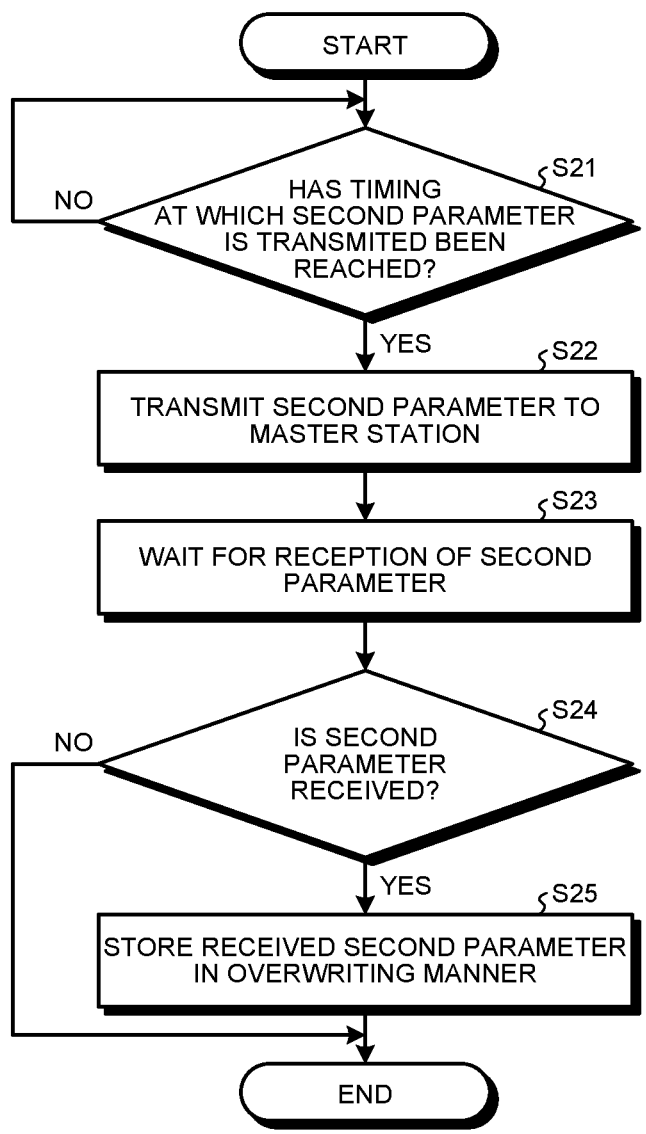
FIG. 13 is a flowchart explaining an operation of the remote station to prepare for replacement of a slave communication unit.

FIG. 13 is a flowchart explaining an operation of the remote station 20 to prepare for replacement of the slave communication unit 21. The operation illustrated in FIG. 13 is realized when the arithmetic unit 210 of the slave communication unit 21 executes the firmware program 215. The arithmetic unit 210 of the slave communication unit 21 determines whether timing at which the second parameter 216 is transmitted has been reached (S21). When the timing at which the second parameter 216 is transmitted has not been reached (No at S21), the arithmetic unit 210 of the slave communication unit 21 executes the processing at S21 again.

Note that a method of determining the timing at which the second parameter 216 is transmitted is arbitrarily selected. For example, the arithmetic unit 210 of the slave communication unit 21 may determine that S21 is Yes after a predetermined period of time has passed since the last Yes was determined at S21. Also, when the PLC 11 of the master station 10 issues a predetermined signal and the signal is detected, the arithmetic unit 210 of the slave communication unit 21 may determine that S21 is Yes.

When the timing at which the second parameter 216 is transmitted has been reached (Yes at S21), the arithmetic unit 210 of the slave communication unit 21 transmits the second parameter 216 stored in the memory 211 of the slave communication unit 21 to the master station 10 (S22). Then, the arithmetic unit 210 of the slave communication unit 21 waits for the reception of the second parameter 216a from the master station 10 (S23) and determines whether the second parameter 216a has been received from the master station 10 (S24). Note that the processing at S23 is continued, for example, for a predetermined period of time. When the second parameter 216a has been received from the master station 10 (Yes at S24), the arithmetic unit 210 of the slave communication unit 21 writes the received second parameter 216a over the second parameter 216 stored in the memory 211 (S25) and ends the operation. When the second parameter 216a has not been received from the master station 10 (No at S24), the arithmetic unit 210 of the slave communication unit 21 skips the processing at S25.

Figure 14:
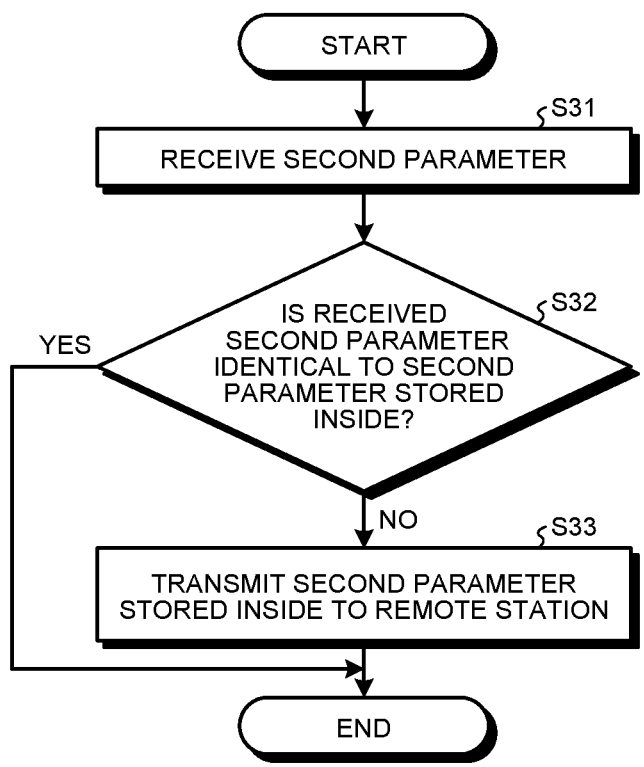
FIG. 14 is a flowchart explaining an operation of the master station to prepare for replacement of a slave communication unit.

FIG. 14 is a flowchart explaining an operation of the master station 10 to prepare for replacement of the slave communication unit 21. The operation illustrated in FIG. 14 is realized when the arithmetic unit 110 of the PLC 11 executes the firmware program 114. First, when the second parameter 216 is received from the remote station 20 (S31), the arithmetic unit 110 of the PLC 11 determines whether the second parameter 216a backed up in the memory 111 of the PLC 11 and the received second parameter 216 are identical to each other (S32). When they are not identical to each other (No at S32), the arithmetic unit 110 of the PLC 11 transmits the second parameter 216a backed up in the memory 111 of the PLC 11 to the remote station 20 (S33). Then, the operation of the master station 10 ends. When the second parameter 216a backed up in the memory 111 of the PLC 11 and the received second parameter 216 are identical to each other (Yes at S32), the arithmetic unit 110 of the PLC 11 skips the processing at S33 and ends the operation.

In such a manner, according to the control system 1 of the embodiment of the present invention, the PLC 11 of the master station 10 transmits the assignment object designation information 52 and 62 and the assignment rules 51 and 61 to the slave communication units 21 and 31. The assignment object designation information 52 and 62 designates an object to be assigned to the PLC device among unit data input/output to/from the general units (unit 22-0 to 22-2 and unit 32-0 to 32-2) of the remote stations 20 and 30. Then, on the basis of the received assignment object designation information 52 and 62 and assignment rules 51 and 61, the slave communication units 21 and 31 assign, to the communication memories 213 and 313, unit data input/output to/from the general units (unit 22-0 to 22-2 and unit 32-0 to 32-2). Accordingly, assignment of refresh devices in the remote stations 20 and 30 is executed automatically when a user only sets all pieces of information, which is required for the assignment of the refresh devices, in the PLC 11 of the master station 10. Thus, it is possible to easily execute setting of parameters (first parameter 116 and second parameters 216 and 316) compared to a case of separately performing assignment of a refresh device in the master station 10 and assignment of a refresh device in each of the remote stations 20 and 30. Also, in a case of manually and separately performing assignment of a refresh device in the master station 10 and assignment of a refresh device in each of the remote stations 20 and 30, an assignment error of a refresh device in which the first parameter 116 and the second parameters 216 and 316 are not consistent may occur. However, according to the embodiment of the present invention, the second parameters 216 and 316 are generated automatically in the remote stations 20 and 30 on the basis of the assignment object designation information 52 and 62 and the assignment rules 51 and 61 previously set in the master station 10. Thus, it is possible to reduce occurrence of the assignment error of the refresh device.

Also, the PLC 11 of the master station 10 stores the second parameters 216a and 316a, which are backup data on the second parameters 216 and 316. The slave communication units 21 and 31 of the remote stations 20 and 30 transmit the second parameters 216 and 316 respectively stored therein to the PLC 11 of the master station 10. The PLC 11 of the master station 10 compares the received second parameters 216 and 316 with the second parameters 216a and 316a, which are backup data stored in the PLC 11 itself. When they are different from each other, the PLC 11 of the master station 10 transmits the second parameters 216a and 316a to the remote stations 20 and 30. When the second parameters 216a and 316a are received, the slave communication units 21 and 31 of the remote stations 20 and 30 write the received second parameters 216a and 316a over the second parameters 216 and 316 stored therein. Accordingly, even when a user replaces the slave communication units 21 and 31, the second parameters 216 and 316 are updated automatically. Thus, it becomes unnecessary for the user to manually update the second parameters 216 and 316.

REFERENCE SIGNS LIST 1 control system, 10 master station, 11 PLC, master communication unit, 13-0 to 13-2, 22-0 to 22-2, 32-0 to 32-2 unit, 14, 23, 118, 123, 217 bus, 20, 30 remote station, 21, 31 slave communication unit, 40 network, 50, 60 remote station information, 51, 61 assignment rule, 52, 62 assignment object designation information, 110, 210 arithmetic unit, 111, 211 memory, 112, 122, 212, 222 bus I/F, 113 user program, 114, 215 firmware program, 115 remote station information group, 116 first parameter, 117 device region, 120, 213, 313 communication memory, 120a, 213a, 313a first region, 120b, 213b, 313b second region, 121, 214 network I/F, 216, 216a, 316, 316a second parameter, 220 unit main part, 221, 321 shared memory, 1161 first master assignment information, 1162 second master assignment information.

The invention claimed is:

1. A control system comprising:
   a master station that includes a first memory and a first processing unit that executes a user program, the user program accessing a plurality of positions in the first memory by using different logical addresses; and
   a remote station that includes a second processing unit, a subunit to or from which one or more pieces of data is input or output, a first buffer for data transfer between the first memory and the subunit, and a second memory, the remote station being connected to the master station through a transmission path, wherein
   the master station stores in advance first assignment information that associates each of the positions in the first memory with the first buffer for each of the logical addresses,
   the first processing unit transmits, to the second processing unit, first designation information designating data that is among the one or more pieces of data and to which a logical address is assigned and second designation information designating an assignment rule, and
   after the first designation information and the second designation information are received, the second processing unit assigns data that is designated by the first designation information and to which the logical address is assigned to the first buffer in accordance with the assignment rule designated by the second designation information, writes an assignment result in second assignment information, and stores the second assignment information in the second memory.

2. The control system according to claim 1, wherein the master station includes a third memory that stores backup data on the second assignment information,
   the second processing unit, after replacement, transmits the second assignment information stored in the second memory to the first processing unit,
   the first processing unit compares the received second assignment information with the backup data stored in the third memory, and transmits the backup data to the second processing unit when the received second assignment information and the backup data are not identical to each other, and
   when the backup data is received, the second processing unit writes the received backup data over the second assignment information stored in the second memory.

3. The control system according to claim 1, wherein
   the remote station further includes a backplane including a plurality of slots to each of which the subunit is connected, and
   the assignment rule prescribes a correspondence relation between an identification number of a slot to which the subunit is connected and an address in the first buffer.

4. The control system according to claim 1, wherein
   the subunit includes a second buffer for inputting or outputting the one or more pieces of data, and the assignment rule prescribes a correspondence relation between an address in the second buffer and an address in the first buffer.

5. A master station including a first memory and a first processing unit executing a user program, the user program accessing a plurality of positions in the first memory by using different logical addresses, wherein
the master station is connected, through a transmission path, to a remote station including a second processing unit, a subunit to or from which one or more pieces of data is input or output, and a first buffer for data transfer between the first memory and the subunit,
the master station stores in advance first assignment information that associates each of the positions in the first memory with the first buffer for each of the logical addresses, and
the first processing unit transmits, to the second processing unit, first designation information designating data that is among the one or more pieces of data and to which a logical address is assigned and second designation information designating an assignment rule.

6. The master station according to claim 5, wherein
after the first designation information and the second designation information are received, the second processing unit assigns data that is designated by the first designation information and to which a logical address is assigned to the first buffer in accordance with the assignment rule designated by the second designation information,
the master station further includes a second memory that stores backup data on second assignment information describing an assignment result of the data designated by the first designation information, and
when the second assignment information is received from the second processing unit, the first processing unit compares the received second assignment information with the backup data stored in the second memory, and transmits the backup data to the second processing unit when the received second assignment information and the backup data are not identical to each other.

7. A remote station that is connected, through a transmission path, to a master station including a first memory and a first processing unit executing a user program, the user program accessing a plurality of positions in the first memory by using different logical addresses, the remote station comprising:
a second processing unit;
a subunit to or from which one or more pieces of data is input or output;
a first buffer for data transfer between the first memory and the subunit; and
a second memory, wherein
when first designation information designating data that is among the one or more pieces of data and to which a logical address is assigned and second designation information designating an assignment rule are received from the first processing unit, the second processing unit assigns data that is designated by the first designation information and to which a logical address is assigned to the first buffer in accordance with the assignment rule designated by the second designation information, writes an assignment result in assignment information, and stores the assignment information in the second memory.

8. The remote station according to claim 7, wherein
the master station includes a third memory that stores backup data on the assignment information, and
the second processing unit, after replacement, transmits the assignment information stored in the second memory to the first processing unit and writes, when the backup data is received from the first processing unit, the received backup data over the assignment information stored in the second memory.

* * * * *